United States Patent [19]
Lake

[11] Patent Number: 4,834,883
[45] Date of Patent: May 30, 1989

[54] FILTER CLEANING APPARATUS
[75] Inventor: Joseph A. Lake, Rockford, Ill.
[73] Assignee: David C. Lake, Rockford, Ill.
[21] Appl. No.: 132,346
[22] Filed: Dec. 14, 1987
[51] Int. Cl.$^4$ ............................................. B01D 25/38
[52] U.S. Cl. ................................. 210/332; 210/409; 210/413
[58] Field of Search ............... 210/332, 407, 334, 409, 210/413, 772

[56] References Cited
U.S. PATENT DOCUMENTS

| | | | |
|---|---|---|---|
| 3,285,417 | 11/1966 | Schmidt et al. | 210/409 |
| 3,326,381 | 6/1967 | Fuller, Jr. | 210/332 |
| 3,344,922 | 10/1967 | Kracklauer | 210/332 |
| 3,426,907 | 2/1969 | Stone | 210/332 |
| 3,647,071 | 3/1972 | Lamort | 210/332 |
| 4,128,480 | 12/1978 | Lumsden | 210/332 |

Primary Examiner—Richard V. Fisher
Assistant Examiner—Coreen Y. Lee
Attorney, Agent, or Firm—Leydig, Voit & Mayer

[57] ABSTRACT

The filter tubes of a swimming pool filter are cleaned by a spray nozzle connected to a high pressure water source and carried on the end of a wand adapted to be inserted slidably through the drain valve and moved back and forth to cause the spray nozzle to traverse back and forth beneath the tubes. Dirty water from the filter is discharged around the wand and through the drain valve.

4 Claims, 1 Drawing Sheet

FILTER CLEANING APPARATUS

BACKGROUND OF THE INVENTION

This invention relates to apparatus for cleaning a filter which is adapted to extract contaminants from a liquid.

More particularly, the invention relates to apparatus for cleaning a swimming pool filter and specifically a filter of the same general type as sold by Hayward Manufacturing Company, Inc. of Elizabeth, N.J. under the trademark PERFLEX. Such a filter comprises an upright vessel having a plurality of porous filter tubes whose lower ends are spaced upwardly from the bottom of the vessel. The tubes are coated with diatomite earth filter powder which removes contaminants from the pool water as the water flows through the tubes. A drain valve is located adjacent the lower end of the vessel and may be selectively opened in order to drain contaminants from the vessel.

Eventually, accumulated contaminants will clog the filter tubes and will cause the filter pressure to rise and the flow to diminish. It then becomes necessary to clean the tubes in order to restore the filter to efficient operation. In a PERFLEX filter of the type described above, cleaning of the tubes is achieved by a "bump" method. That is, the bank of filter tubes is repeatedly raised upwardly and then jarred downwardly in order to shake contaminants off of the tubes.

In many instances, however, the so-called bump method does not effectively clean the tubes. If the algae and bacteria content of the pool water is high, the algae and bacteria tend to "grow" in the diatonic earth powder and tend to cling to the tubes so as to resist being dislodged from the tubes by shaking.

SUMMARY OF THE INVENTION

The general aim of the present invention is to provide very simple and inexpensive apparatus which may be used in a quick and simple manner to effect thorough cleaning of the filter tubes of a filter of the above type.

A more detailed object is to achieve the foregoing by providing cleaning apparatus in the form of a tubular wand having one end adapted to be connected to a common garden hose and having a free end which carries a spray nozzle. To clean the filter tubes, the nozzle and part of the wand are inserted slidably through the drain valve and then are moved back and forth to cause the spray nozzle to traverse beneath the filter tubes and remove contaminants therefrom.

The invention also resides in the unique relationship between the wand and the drain valve to enable contaminants to discharge through the valve at the same time that the filter elements are being cleaned by the spray nozzle.

These and other objects and advantages of the invention will become more apparent from the following detailed description when taken in conjunction with the accompanying drawings.

DETAILED DESCRIPTION OF THE PREFERRED EMBODIMENT

Figure 1:
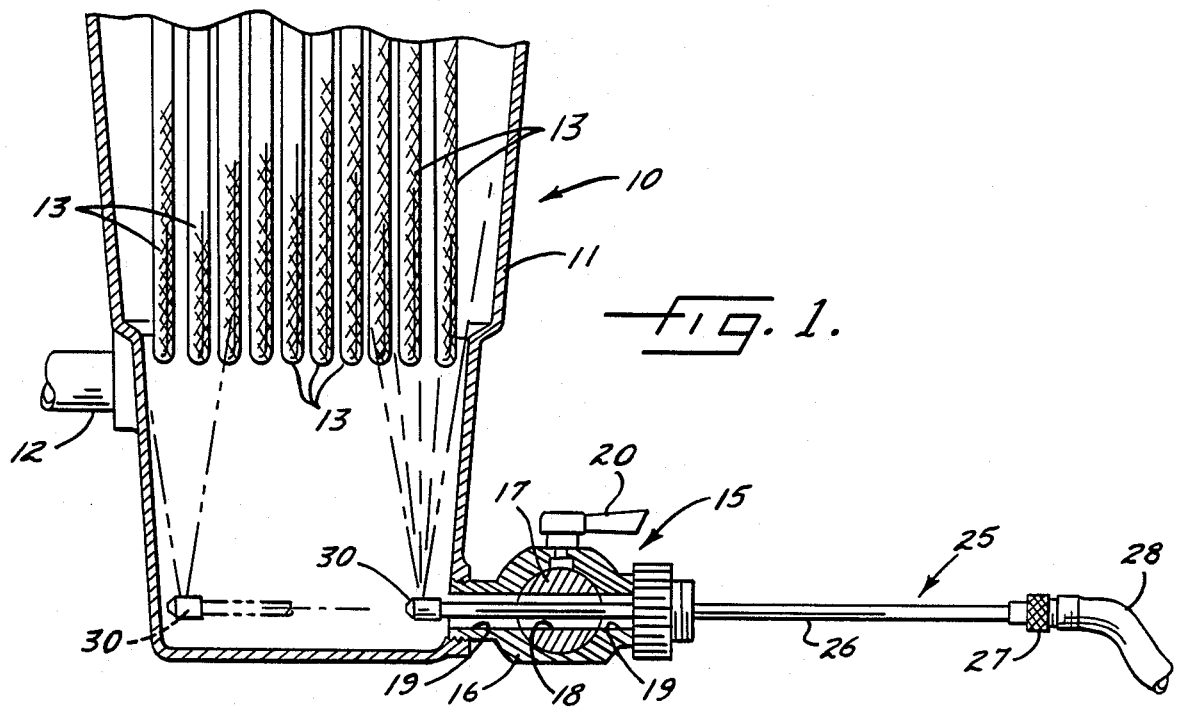
FIG. 1 is a fragmentary view, partly in elevation and partly in section, and showing a typical filter being cleaned by new and improved cleaning apparatus incorporating the unique features of the present invention.
Figure 3:
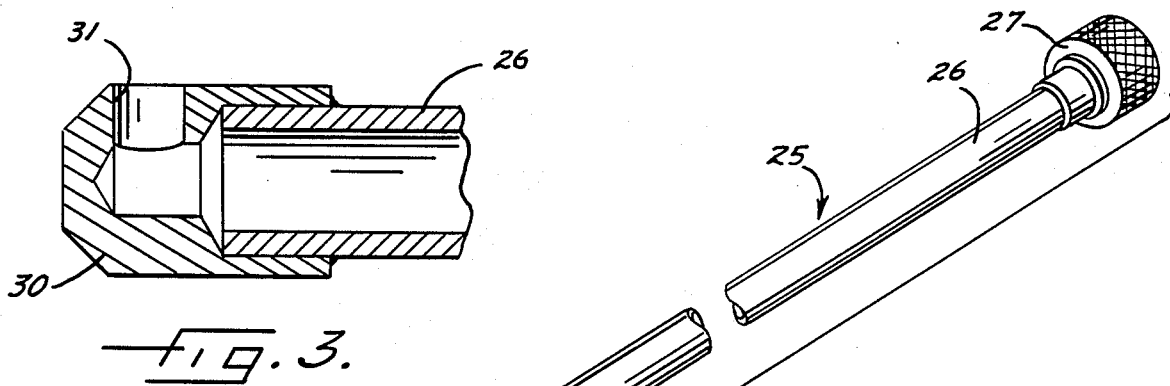
FIG. 3 is an enlarged fragmentary cross-section taken along the line 3—3 of FIG. 2.
Figure 2:
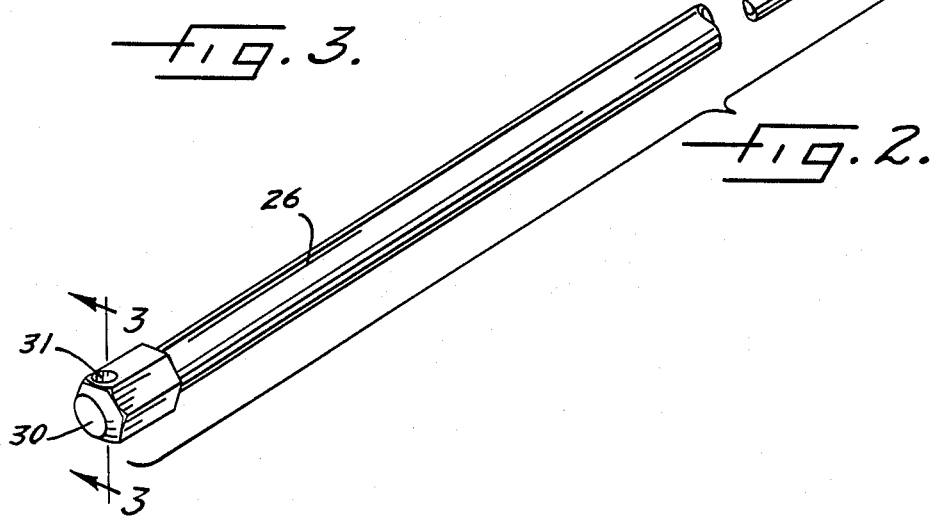
FIG. 2 is a perspective view of the cleaning apparatus shown in FIG. 1.

For purposes of illustration, the present invention is shown in the drawings in conjunction with a filter 10 and specifically in conjunction with a filter for removing debris, algae, microscopic dust and pollen and other contaminants from the water of a swimming pool. The specific filter which has been shown is sold by Hayward Manufacturing Company, Inc. under the trade designation PERFLEX EC40-75. Hobson, Jr. U.S. Pat. No. 3,100,190 discloses a filter which is generally similar to the filter 10.

Briefly, the filter 10 includes an upright vessel or tank 11 having an inlet 12 for receiving dirty water pumped from the pool. The inlet is located just below a circular array of vertically extending filter elements or tubes 13 having closed lower ends. Each tube is made of porous material and is coated on its outer side with diatomite earth powder (D.E.). As the water flows upwardly through the tank 11, it passes through the D.E. and then through the tubes to an outlet (not shown) at the top portion of the tank. The D.E. is capable of filtering very fine and even microscopic particles from the water.

Located below the inlet 12 is a drain valve 15 having a body 16 which is suitably connected to the tank 11. A valve member 17 which herein is in the form of a sphere is rotatably supported by the valve body and is formed with a straight and elongated flow passage 18. When the valve member is in its open position as shown in FIG. 1, the passage 18 is located in alignment with straight passages 19 in the valve body 16 so as to permit water to drain from the tank. By turning a handle 20, the valve member may be turned to a closed position in which the passage 18 extends crosswise of the passages 19 and closes off the tank.

Contaminants in the water are stopped by the tubes 13 and eventually accumulate to the point where the flow through the tubes diminishes and the filter pressure rises. When this occurs and cleaning is required, the filter pump is shut down. The bank of filter tubes then is "bumped" upwardly and downwardly in the tank 11 in a well known manner and by a "bump" handle (not shown) so as to jar the contaminants off of the tubes. Thereafter, the drain valve 15 is opened to allow the contaminants to discharge out of the tank.

In accordance with the present invention, provision is made of auxiliary tube cleaning apparatus 25 for removing algae, bacteria and the like which cannot be effectively jarred from the tubes 13 by the bump method and which tend to "grow" in and cause coagulation of the D.E. powder on the tubes. Herein, the cleaning apparatus 25 includes an elongated tubular wand 26 made of copper or the like and having one end which is fitted with a conventional coupling 27 to enable the wand to be connected to a common garden hose 28. When the valve member 17 of the valve 15 is in its open position, the wand may be extended through the passages 18 and 19 and thrust partially into the tank 11.

Secured to the free end of the wand 26 is a spray nozzle 30 having an upwardly opening spray orifice 31. The nozzle is sufficiently small in diameter to move through the passages 18 and 19 when the wand is thrust into the tank 11.

With the foregoing arrangement, the wand 26 may be connected to the garden hose 28 for the purpose of supplying pressurized water to the nozzle 30. Such water sprays upwardly out of the discharge orifice 31 and hits the filter tubes 13 to wash dirt, algae and bacteria therefrom. By sliding the wand back and forth within the valve 15, the nozzle may be traversed back and forth beneath the tubes to effect thorough cleaning of all of the tubes.

As shown in FIG. 1, the wand 26 is substantially smaller in diameter than the passages 18 and 19 and thus is received in the passages with relatively large radial clearance. As a result, dirty water may drain through the passages and around the wand at the same time clean water is being sprayed against the tubes 13 to effect cleaning thereof.

I claim:

1. In a combination of a water filter and means for selectively cleaning the filter, said filter comprising an upright vessel, a plurality of filter elements located in said vessel and spaced upwardly from the bottom thereof, and a normally closed valve located adjacent the bottom of said vessel, said valve including a valve member for selectively opening the valve to drain the vessel, said combination being characterized in that said cleaning means comprises an elongated tubular wand having a spray nozzle on one end, and means on the other end of said wand for connecting said wand to a source of water pressure, said wand extending slidably through said valve and being located such that said nozzle is positioned within said vessel beneath said filter elements, said wand being sufficiently long to move longitudinally within said valve to cause said nozzle to traverse beneath and clean said filter elements by spraying water against the filter elements, the water sprayed against said filter elements draining out of said vessel through said valve and around said wand when the valve member is selectively opened.

2. The combination defined in claim 1 in which said valve member is movable between open and closed position, said valve member having an elongated passage which communicates with said vessel when said valve member is in said open position, said wand extending through said passage with radial clearance whereby water in said vessel may drain around said wand and out of said passage.

3. The combination defined in claim 2 in which said nozzle is sufficiently small to extend through said passage.

4. In a combination of a diatomite earth water filter and means for selectively cleaning said filter, said filter comprising an upright vessel, a plurality of upright tubes located in said vessel and having closed lower ends spaced upwardly from the bottom of said vessel, said tubes being porous and being coated with diatomite earth powder, a drain valve located adjacent the bottom of said vessel and having a valve member movable between open and closed positions, said valve member having an elongated passage which permits water and contaminants to drain from said vessel when said valve member is in said open position, said combination being characterized in that said cleaning means comprise an elongated tubular wand having a spray nozzle on one end, said nozzle having at least one upwardly opening orifice and means on the other end of said wand for connecting said wand to a source of water pressure, said wand extending slidably through the passage in said valve member and being located such that said nozzle is positioned within said vessel beneath said tubes and with said orifice facing upwardly, being sufficiently long to move longitudinally within said passage to cause said nozzle to traverse beneath and clean said tubes by spraying water upwardly out of said orifice and against the tubes, said wand extending through said passage with radial clearance whereby water and contaminants in said vessel may drain around said wand and out of said vessel when the valve member is in said open position.

* * * * *